No. 671,532. Patented Apr. 9, 1901.
J. H. WARREN & J. A. HOFFMAN.
AUTOMOBILE VEHICLE.
(Application filed Oct. 15, 1900.)
(No Model.) 2 Sheets—Sheet 2.
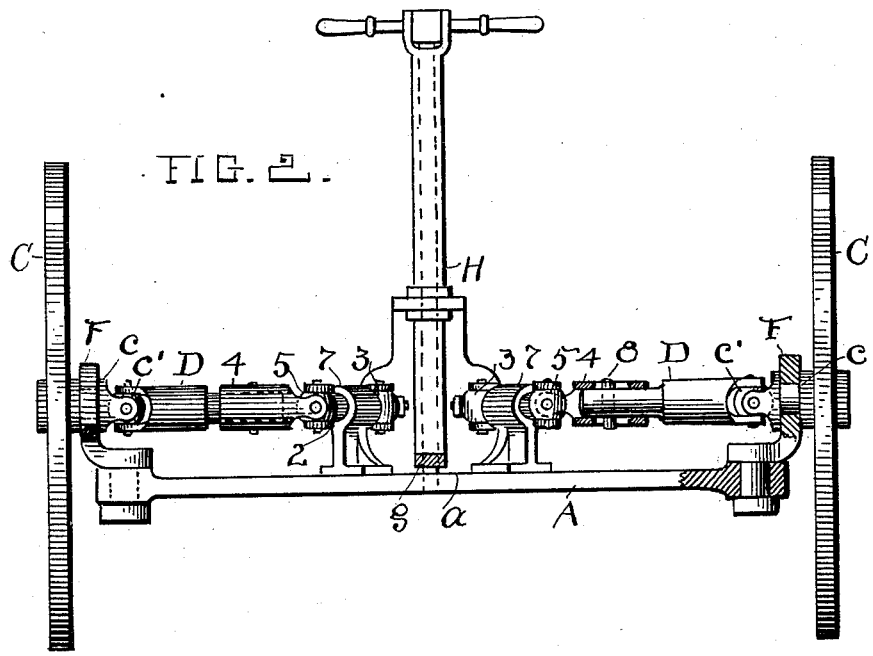
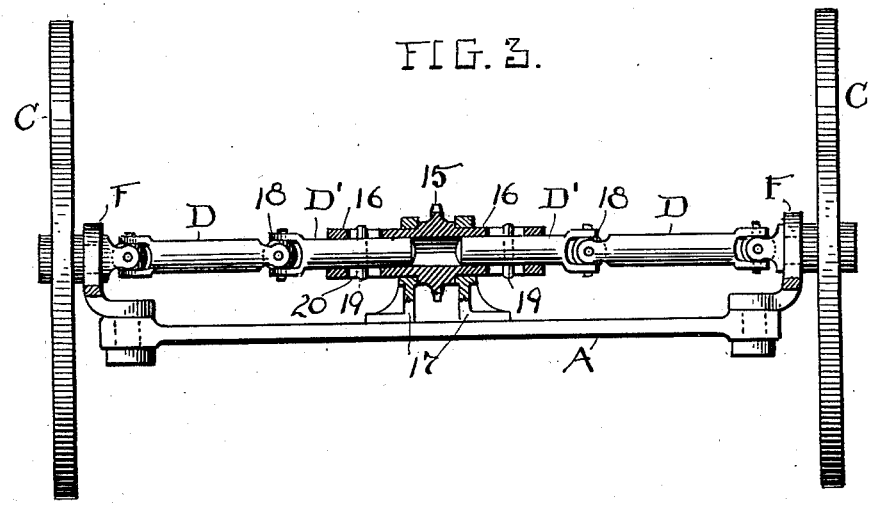
ATTEST.
W. B. Moser
M. A. Sheehan
INVENTORS
JOHN H. WARREN
JOHN A. HOFFMAN
BY H. T. Fisher ATTY

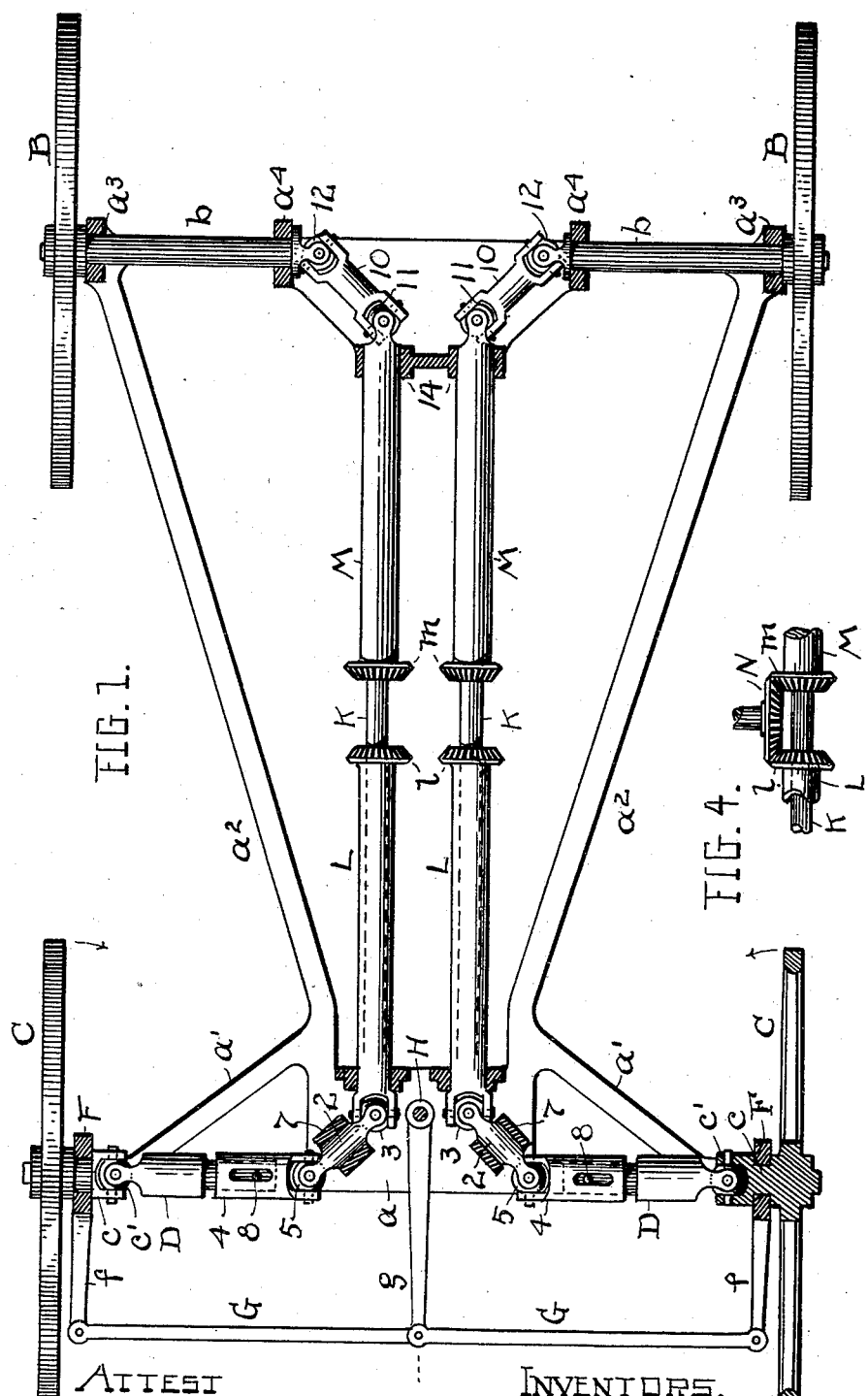

UNITED STATES PATENT OFFICE.

JOHN H. WARREN AND JOHN A. HOFFMAN, OF CLEVELAND, OHIO.

AUTOMOBILE VEHICLE.

SPECIFICATION forming part of Letters Patent No. 671,532, dated April 9, 1901.

Application filed October 15, 1900. Serial No. 33,051. (No model.)

*To all whom it may concern:*

Be it known that we, JOHN H. WARREN and JOHN A. HOFFMAN, citizens of the United States, residing at Cleveland, in the county of Cuyahoga and State of Ohio, have invented certain new and useful Improvements in Automobile Vehicles; and we do declare that the following is a full, clear, and exact description of the invention, which will enable others skilled in the art to which it appertains to make and use the same.

Our invention relates to automobile vehicles; and the special objects of the invention are to provide improved facilities for applying the power to the axles, one or both, by direct and positive mechanism, and for steering and turning the vehicle, all substantially as shown and described, and particularly pointed out in the claims.

In the accompanying drawings, Figure 1 is a plan view of the invention as applied to a four-wheel vehicle with certain of the parts in section, as hereinafter fully described. Fig. 2 is a front elevation of the vehicle, looking in from the left of Fig. 1. Fig. 3 is an elevation, partly in section, of a modification of the invention. Fig. 4 is a detail in side elevation of the bevel-gears for applying the power.

A represents the rigid bottom frame of the running-gear from and upon which the movable and operative parts are supported. This frame has, preferably, the shape shown in plan, Fig. 1, extending at its four angles directly to the four several wheels, front and rear, and having centrally at its front a table portion $a$ between its short arms $a'$. The long arms $a^2$ run back to the rear wheels. This frame thus constructed constitutes the coupling between the wheels and their spindles or sustaining parts, and the rear wheels B have spindles $b$ supported at their ends, each in posts or uprights $a^3$ and $a^4$, rigid with frame A and in which said spindles have suitable bearings to rotate. Wheels B are rigid with their spindles.

The front wheels C each have a hub $c$ of suitable construction, preferably solid, as shown, and constructed at its inner end or portion with opposite ears between and in which the coupling or knuckle $c'$ is pivoted.

The arm D also has ears pivoted on the said coupling $c'$, which makes a universal but positively-operating joint at this point for the rotation of arm D and its connections from or back to the power and at the same time leaves wheel C free to be turned by the steering mechanism. Both front wheels alike are supported from frame A by an elbow or right-angled post or standard F, pivotally engaged in said frame, so as to rotate horizontally but not tilt and having the neck of the wheel-hub $c$ engaged in its upright portion, so as to turn in said standard but not tilt. This keeps the wheel firmly upright, and yet leaves it free to be directed and turned at the will of the operator. Each standard has an arm $f$ connected at their outer ends by rod or bar G, which in turn is controlled from the steering-post H, through a central arm $g$. It will thus be seen that the front wheels not only have their supports immediately at their inner sides, but that the means for controlling their direction and position relatively is engaged directly with their hubs, thus giving the easiest and best possible control to the driver, and both wheels are moved together at the same time and exactly the same distance in the same direction of travel or backing.

Power is applied, preferably, to both sets of wheels by the construction shown in Figs. 1 and 4; but it may be connected up with either set alone, if preferred, and to this end we employ two parallel shafts, in which are four several tubes or tubular shaft-sections L and M. The tubes L go to the front and the tubes M to the rear, and they have each a bevel-gear $l$ and $m$, respectively, engaged on each side by a bevel power-gear N, Fig. 4. Hence there are two power-gears, one for each side or set of transmitting-gears $l$ and $m$. The several tubes L and M are supported by uprights from the main frame A, in which they have bearings and revolve, and power is conveyed from said tubes to the wheels by a line of jointed but positive mechanism, as shown. Thus there is a universal joint at the front between couplings 2 and the ends of tubes L through knuckle 3, on which there is a double pivot, and the said couplings are in turn connected by a universal joint with sleeve 4, having a sliding engagement with arm D, knuckle 5 serving for this connection. Couplings 2 are each supported from frame A by posts 7, having a sufficiently-long bearing to hold said couplings in fixed alinement, and the sleeves 4 are slotted longitudinally, and pins 8 in the arms D run in said slots, so that thereby there is all necessary accommodation afforded at this point for the easy and prompt turning of the front wheels. In theory there should be no need of such accommodation here, since the outer pivot of arm D is directly over the pivot of standard F; but still we find that there is demand for more or less give-and-take movement between the two connections D and 4. By the slot-and-pin construction this movement is afforded without in any wise impairing the connection for the transmission of power. At the rear the tubes M connect with spindle or shaft sections $b$ by means of couplings 10 and interposed knuckles 11 and 12 at each end, respectively, providing universal joints, as at the front, and parts 14 support the meeting ends of said tubes with couplings 10.

Obviously by employing a smaller gear N and connecting with only one of the bevel-gears $l$ or $m$ either the front or the rear wheels alone will be driven, or we could provide some other way of making engagement with only one set of said gears, front or rear.

In Fig. 3 we show a modification of the invention, wherein the same parts are used as before, except that here the power connections are in alinement between the front wheels and the power is applied by a sprocket-chain to sprocket-wheel 15, rigid with long sleeve 16 and which is supported by double standard 17. Arms D are here supplemented by extensions D', jointed therewith through knuckles 18, and these have pins 19 running in slots 20 in sleeve 16. This construction corresponds to the connection between parts D and 4 in Fig. 1.

We have thus described the invention as it is here shown; but obviously it may be more or less modified here and there without departing from the spirit of the invention.

If desired, the hub $c$ can be made with spindles and the wheels removably, but rigidly, mounted thereon.

What we claim is—

1. In a vehicle of the automobile type, propelling mechanism comprising a pair of front wheels and posts in which they are supported, and a separate extensible axle for each of said wheels, in combination with a separate horizontally-arranged shaft for propelling each wheel, a link connection from each shaft to each extensible axle, and a fixed support for said link connection, substantially as described.

2. In an automobile vehicle, a set of wheels, a jointed extensible axle connected with the hub of each wheel and separate means connected with each of said axles to turn the wheel comprising a longitudinally-arranged drive-shaft and link connections with said axles, substantially as described.

3. A vehicle frame and wheels, posts rotatably supported on a vertical axis in said frame and having the wheel-hubs rotatably mounted therein, and separate universally-jointed driving mechanism connected with the hub of each wheel, said mechanism comprising separate extensible axles, and a separate line of horizontally-arranged drive-shafts for the wheels on each side of the vehicle, substantially as described.

4. The frame of the vehicle and the wheels, and right-angled uprights pivoted in their horizontal portions in said frame and having the hubs of the wheels supported in their vertical portions, separate extensible axles connected with said wheels and separate drive-shafts, substantially as described.

5. The frame of the vehicle and posts pivoted thereon, wheels rotatably supported by said posts, separate jointed axles united with said wheels and fixed supports secured to said frame and carrying said axles, in combination with a separate line of shafting for the wheels at each side of the vehicle and flexibly connected at each end by links with the respective wheel-axles, and gear connections between the ends of said shafts to apply the power, substantially as described.

6. In automobile vehicles, a rigid frame, the front and rear wheels, and posts horizontally rotatable on said frame and supporting said wheels, in combination with extensible drive mechanism pivotally connected with the hubs of said wheels and comprising a double line of shafts parallel to each other from front to rear of the vehicle and each shaft having power connections with the front and rear wheels on one side of the vehicle, substantially as described.

7. In automobile vehicles, front and rear wheels, a separate line of jointed extensible shaft mechanism to each wheel, a pair of parallel shafts lengthwise of the vehicle and a separate power connection for each wheel supported by said shafts, substantially as described.

8. The main frame, a set of wheels horizontally supported on said frame and separate extensible axles for each of said wheels, in combination with steering mechanism connecting said wheels, said mechanism comprising right-angled parts rotatable on the main frame and supporting said wheels, arms on said parts and a link-and-lever mechanism connecting said arms forward of the said wheels, substantially as described.

Witness our hands to the foregoing specification this 1st day of October, 1900.

JOHN H. WARREN.
JOHN A. HOFFMAN.

Witnesses:
R. B. MOSER,
M. A. SHEHAN.